United States Patent [19]

Gardner et al.

[11] Patent Number: 4,813,996
[45] Date of Patent: Mar. 21, 1989

[54] PRODUCTION OF NUTRIENT MATERIAL

[76] Inventors: Thomas H. Gardner, 8 Haven Road; Gareth D. J. Whitehead, 6 Haven Road, both of Exerter, Devon, England

[21] Appl. No.: 661,874

[22] Filed: Oct. 17, 1984

Related U.S. Application Data

[63] Continuation of Ser. No. 197,997, Oct. 17, 1980, abandoned.

[30] Foreign Application Priority Data

Feb. 21, 1979 [GB] United Kingdom .................. 796208
Aug. 14, 1979 [GB] United Kingdom ................ 7928310

[51] Int. Cl.⁴ .............................................. C05F 3/00
[52] U.S. Cl. ........................................ 71/21; 71/12; 71/23; 71/25; 426/807; 119/1
[58] Field of Search ........................................ 71/8-10, 71/12, 14, 16, 21, 23, 25, 26, 903, 904; 119/1; 426/55-59, 807

[56] References Cited

U.S. PATENT DOCUMENTS

| 2,813,793 | 11/1957 | Drennan | 119/1 X |
| 3,269,824 | 8/1966 | Aswell | 71/25 X |
| 3,980,050 | 9/1976 | Neubauer | 119/1 |
| 4,201,128 | 5/1980 | Whitehead et al. | 71/21 X |

FOREIGN PATENT DOCUMENTS

| 2705098 | 8/1978 | Fed. Rep. of Germany | 71/21 |
| 18423 | 1/1904 | United Kingdom | 71/16 |

Primary Examiner—Ferris H. Lander
Attorney, Agent, or Firm—Fulwider, Patton, Rieber, Lee & Utecht

[57] ABSTRACT

Particulate nutrient material for use as fertilizer or animal feedstock is produced from absorbent paper shreds or particles, for example of newsprint, impregnated with animal manure—for example as a result of use of the paper as bedding for chickens. The impregnated paper shreds or particles are compacted and pelleted, and may be mixed with superphosphate and/or fishmeal before pelleting.

22 Claims, 3 Drawing Sheets

PRODUCTION OF NUTRIENT MATERIAL

This is a continuation of Ser. No. 197,997, filed Oct. 17, 1980 and now abandoned.

This invention relates to the production of particulate nutrient material, chiefly, but not exclusively, for use as fertiliser, as a soil conditioner, or, in some cases, as an animal feedstock.

The invention affords a means of utilising the high nutrient content of an animal manure, particularly chicken manure, to provide an effective fertiliser or, in some cases, an animal feedstock base.

The invention provides in one aspect a process for the production of nutrient material in pellet form, comprising the mixing of absorbent paper shreds or cellulose fibres impregnated with animal manure and the formation of the material into pellets. Where the impregnating manure is chicken manure the impregnated paper shreds or fibres may be admixed with a superphosphate before pelleting to fix the nitrogen which would otherwise be released as ammonia.

A process according to one embodiment of the invention for the production of particulate nutrient material comprises:

(i) a mixing stage in which absorbent paper shreds impregnated with animal manure are mixed with a supherphosphate;

(ii) a mincing stage in which the mixed material from stage (i) is extruded through a mincer and cut into compacted pellets, and (iii) a comminution stage in which the pellets are broken up into particles.

The mincing stage, which may be carried out using an industrial mincing unit or pelleting machine, entails extruding the material through orifices in a plate, accompanied by heating of the material frictionally.

If it is desired to produce a nutrient material for use as a feedstuff base it is arranged that the material is heated frictionally in the mincing stage or pelleting machine to a sufficient temperature and for a sufficient time to at least partially sterilise the mixture extruded through the orifice plate.

Sterilisation may alternatively be effected completely or partially by irradiation of the mixture, for example by ultra-violet or gamma radiation.

It has been found that an effective way of regulating the heating of the material extruded in the mincing stage is by control of the proportion of dry material in the mixture fed to the mincing apparatus or pelleting machine.

If the material is required in particulate rather than pelleted form comminution may be effected by feeding the pellets to a rotating vaned impeller, the pellets being broken up by the impeller to produce particles which may subsequently be aereated by passing them through a cyclone. The resulting particulate material is rich in nutrients derived from the manure content of the original mixture and is highly suitable as a fertiliser and soil conditioner. Moreover, since the manure in the final product is carried by comminuted particles of paper the material is dry and easy to handle, package and store. The particulate paper-based material is also relatively odour-free.

Also within the scope of the invention is a particulate nutrient material consisting of particles of absorbent paper or cellulose fibre impregnated with animal manure, preferably chicken manure having a controlled moisture content, preferably 12% moisture by weight. The material may also be impregnated with superphosphate and/or fishmeal, according to the intended use of the material and the desired protein content. The absorbent paper base of the particulate material is ideally derived from newsprint, which is non-toxic, thermally insulating and highly absorbent, being derived from wood fibres.

The invention further provides plant for the production of particulate nutrient material comprising mixing apparatus for mixing pieces of absorbent paper impregnated with animal manure, and extrusion or mincing apparatus for extruding the mixed material from the mixing apparatus to form compacted pellets. The apparatus may optionally include a comminuting chamber into which the pellets are fed, the chamber housing a rotary impeller having vanes which break up the pellets into particles.

The invention will be further described, merely by way of example, with reference to the accompanying purely diagrammatic drawings, in which.

Figure 1:
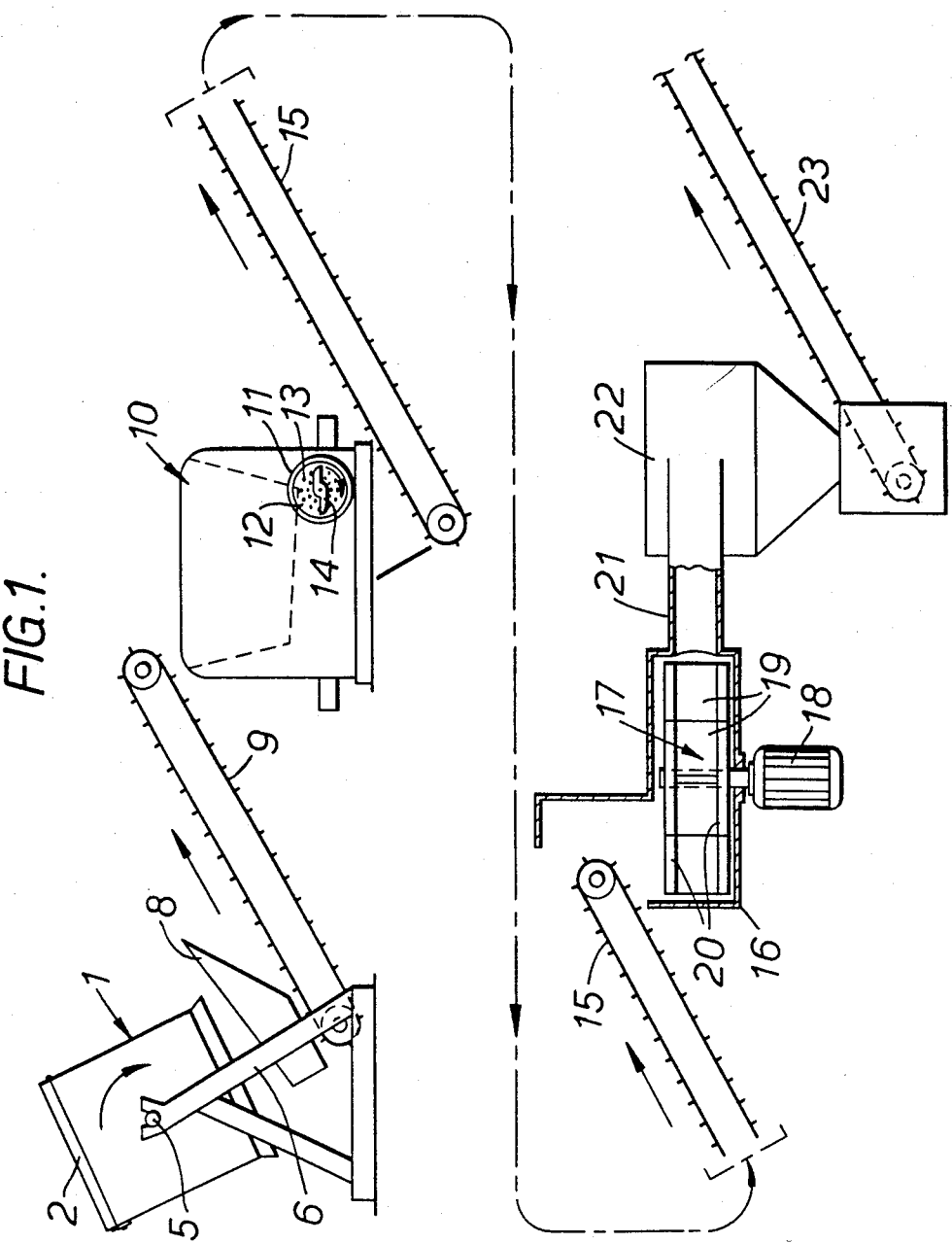
FIG. 1 illustrates schematically in elevation a plant for the production of particulate nutrient material according to one embodiment of the invention.
Figure 2:
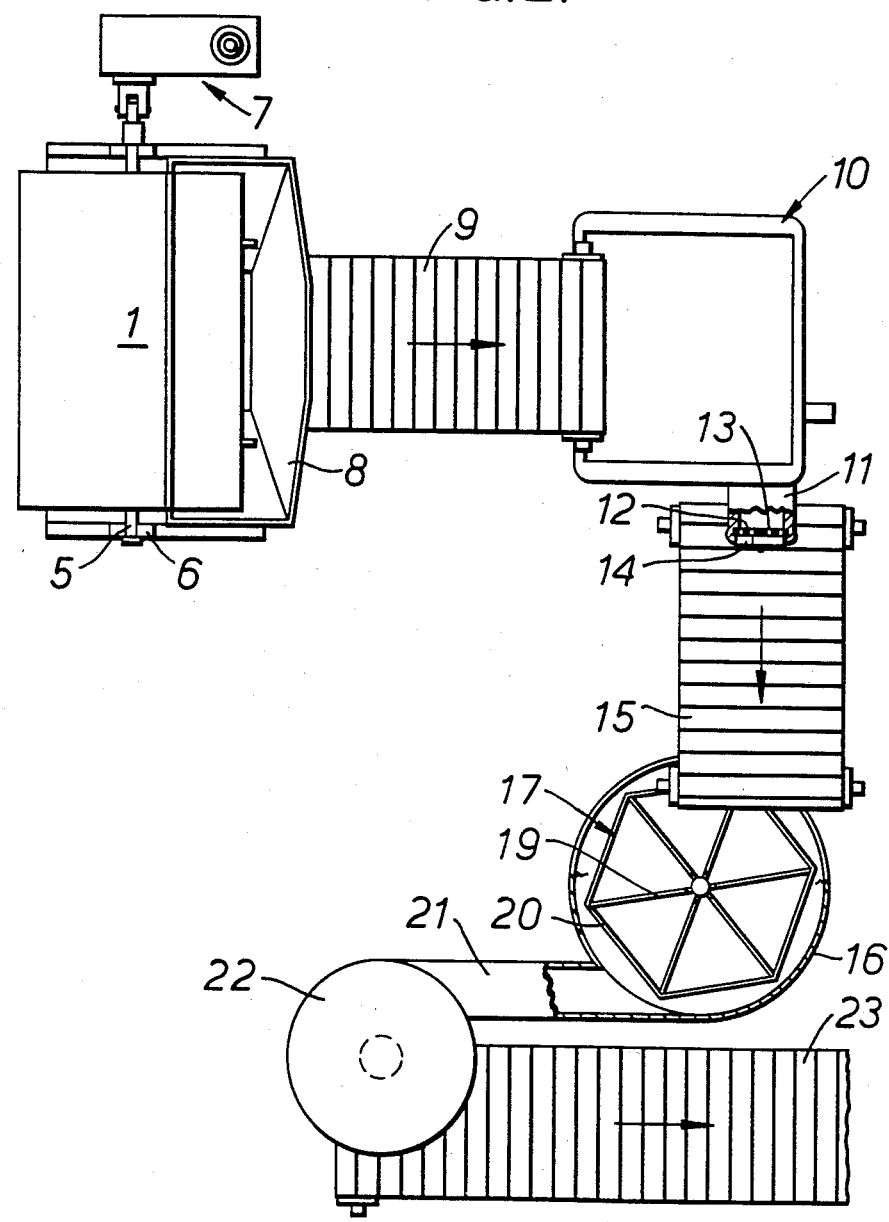
FIG. 2 is a diagrammatic plan view of the plant shown in FIG. 1.
Figure 3:
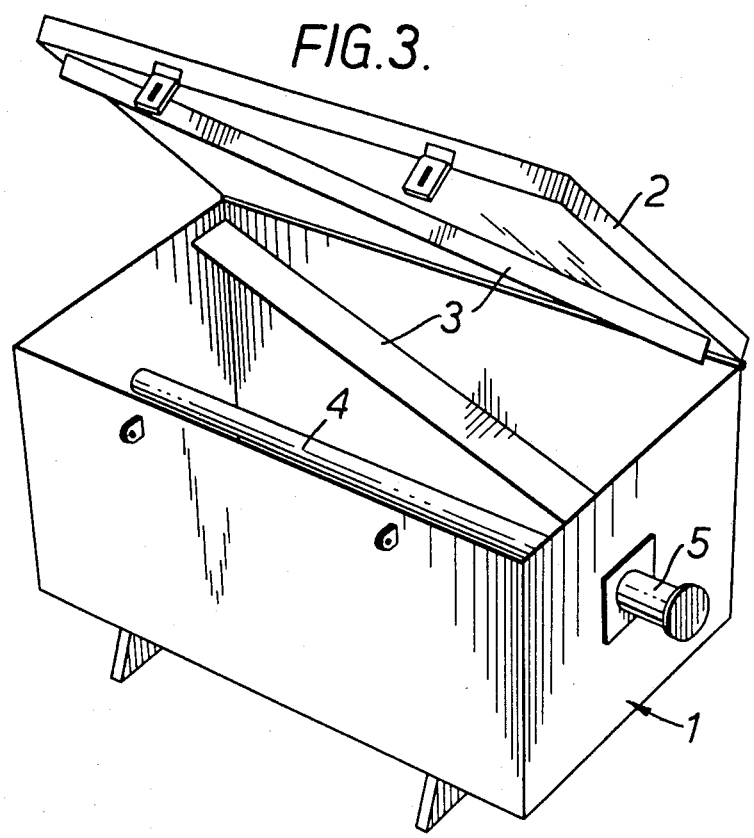
FIG. 3 is a perspective view of one of the mixing containers used in the plant of FIGS. 1 and 2.

Referring first to FIGS. 1 and 2, the illustrated plant is intended for the production of nutrient particles for use as fertilise starting from manureimpregnated shredded paper. The raw material for the process carried out by the plant is in this case obtained from hen batteries where shredded newsprint is used as a bedding material. When soiled the shredded newsprint is collected and will be impregnated with chicken manure.

The manure-impregnated shredded paper is placed in a four-sided mixing chamber 1 of square cross section having a hinged lid 2. As the raw material is introduced into the chamber 1 an additive material is added. For example, the additive may comprise superphosphate in a proportion of 8–10% by weight, the superphosphate being added in stages during the filling of the chamber with soiled paper, to fix the nitrogen by forming ammonium phosphate, checking the release of ammonia gas. When the chamber is full the lid 2 is closed and locked.

Alternatively, or additionally, protein in the form of oil or fishmeal may be added, particularly where the material is intended for use as an animal feedstock. For example, herring meal may be added to form a mixture containing 50–60% by weight of animal manure and 50–40% by weight respectively of fishmeal.

The chamber 1 is provided on its internal surfaces with diagonally extending fins 3 upstanding at right angles to the internal surfaces of the chamber on each of the four longitudinal sides of the chamber 1, including the lid 2, which forms a fourth side of the chamber 1 when closed. A central longitudinal shaft 4 extends through the chamber 1 and is provided at opposite ends with respective trunnions 5 externally of the end faces of the chamber 1. The trunnions 5 are used for supporting the entire chamber 1 for rotation about the axis of the shaft 4, disposed horizontally. Thus the trunnions 5 may be lowered into U-shaped supports carried by fixed support arms 6 at opposite ends of the chamber 1, as shown diagrammatically in FIG. 1, the chamber 1 being raised and lowered into the supports using a suitable lifting crane or truck (not shown).

One or both of the trunnions 5 terminates in a square-section driving portion which is engageable in a cooperating slotted end of the drive shaft of an electric motor-reduction unit 7 (FIG. 2).

Mixing of the material in the chamber 1 is effected by rotating the chamber 1 through about 60 revolutions by means of the motor-reduction unit 7. The mixing of the material is promoted by the fins 3, and the resulting mixed material can then be discharged from the chamber 1 by opening the lid 2, allowing the material to fall into a chute 8.

The mixed raw material is collected from the chute 8 by an elevating conveyor 9 which conveys the material to an industrial mincer unit 10 driven by a heavy duty electric motor (not shown). The mincer unit 10 has a circular outlet duct 11 provided with a plate 12 formed with a number of outlet orifices 13 through which the minced material is extruded in operation of the mincer unit 10.

The mincer unit 10 is modified in the plant of this invention by the addition to the outlet duct 11 of a rotary knife 14 which is rotated, conveniently by a drive derived from the mincing unit 10, over the external surface of the orifice plate 12 to cut the extruded and compacted material into pellets which typically measure about 10 mm in length and have a diameter of approximately 8 mm.

The compacted material extruded from the mincer unit 10 will be heated by the considerable friction generated in the mincing and extrusion process. The temperature may exceed 100° C., the actual temperature being controllable by adding controlled amounts of dry material, for example, dry shredded paper, to the mincer unit 10.

Figure 4:
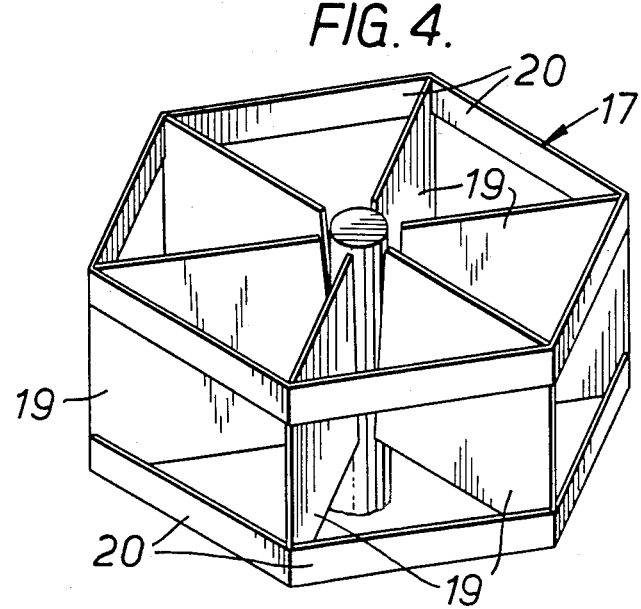
FIG. 4 is a diagrammatic perspective view of the vaned impeller used in the comminuting stage of the plant shown in FIGS. 1 and 2.

The pellets of compacted minced material are conveyed on a further elevating conveyor 15 to a comminuting chamber 16 into which the pellets fall under gravity. The chamber 16 is in the form of a vertical cylinder in which a rotary vaned impeller 17 is mounted coaxially. The impeller 17 is driven by an electric motor 18 at a speed of, typically, 2500–3000 rpm. In the illustrated embodiment the vaned impeller 17 has the construction illustrated in FIG. 4, consisting of six identical radial vanes 19 disposed in planes intersecting the axis of rotation of the rotor 17 and interconnected at their radially outer ends by metal ties 20.

The pellets fall into one half of the comminuting chamber 17, where they are broken up by the rapidly rotating vaned impeller 17, and expelled through a tangential outlet duct 21 leading into a cyclone separator 22.

The purpose of the cyclone separator 22 in this plant is to effect aereation of the pellet fragments, the resulting substantially dry particles of paper impregnated with nutrient material falling to the bottom of the cyclone chamber 22 for collection by an elevating conveyor 23 which conveys the particles to a packing or bag-filling and sealing station (not shown).

If the minced and extruded material is subjected to a sufficiently high temperature upon extrusion to sterilise the material, the resulting particulate nutrient material may be used as a base for animal feed, for example as a base for the feed used by ruminants, as pet food or as a base for fish feed in fish farming. When used for feedstock the material may include further additives such as flavouring constituents.

If the material is required in pelleted form the comminuting stage 16 would of course be omitted, and the extruded pellets would be conveyed over a cooling conveyor. The moisture content of the pellets is preferably controlled by regulating the extrusion process, as described, and in the cooling of the extruded pellets, which is effected by drawing air through the pellets on a conveyor, in a known manner. For packing in plastic bags the pelleted material should preferably have a moisture content of 12% by weight.

We claim:

1. A process for the production of nutrient material in pellet form, characterised by the steps of mixing together animal bedding material consisting essentially of absorbent paper shreds impregnated with animal manure and forming the said material into pellets.

2. A process according to claim 1, in which the impregnated paper shreds are impregnated with chicken manure and admixed with superphosphate before pelleting.

3. A process according to claim 1 or claim 2, in which the absorbent paper shreds are admixed with fishmeal before pelleting.

4. The process of claim 1 wherein the impregnated absorbent paper shreds are shredded newsprint.

5. A process for the production of particulate nutrient material characterised by the following stages:
    (i) a mixing stage (1) in which animal bedding material consisting essentially of absorbent paper shreds impregnated with animal manure are mixed with a superphosphate;
    (ii) a mincing stage (10) in which the mixed material from stage (i) is extruded through a mincer and cut into compacted pellets, and
    (iii) a comminution stage (16, 17) in which the pellets are broken up into particles.

6. A process according to claim 5, characterised in that the mincing stage (10) entails extruding the material through orifices (13) in a plate (12) and the heating of the material frictionally to a sufficient temperature and for a sufficient time to sterilise the mixture extruded through the plate.

7. The process of claim 5 wherein the absorbent paper shreds are shredded newsprint.

8. A process according to claim 5 or claim 6, in which the comminution is effected by passing the pellets through a rotating vaned impeller (17).

9. A process according to claim 8, in which the particles leaving the impeller are subjected to aeration in a cyclone (22).

10. Nutrient material characterised in that it comprises pellets of animal bedding material consisting essentially of absorbent paper shreds impregnated with animal manure and having a controlled moisture content.

11. Nutrient material according to claim 10, in which the pellets are impregnated with a mixture of chicken manure and superphosphate.

12. A nutrient material according to claim 10 or claim 11, in which the pellets of absorbent paper shreds are impregnated with a mixture of animal manure and fishmeal.

13. A nutrient material according to claim 12, in which the pellets contain 50–60% by weight of animal manure and 50–40% by weight respectively of fishmeal.

14. The nutrient material of claim 10 wherein the absorbent paper comprises shredded newsprint.

15. A process for the production of nutrient material, comprising the steps of:
- extruding animal bedding material consisting essentially of shredded newsprint impregnated with animal manure through an extrusion opening in a die plate;
- controlling the moisture content of the extruded nutrient mixture; and
- dividing the extruded nutrient mixture into relatively small pellets.

16. The process of claim 15 wherein the nutrient mixture includes shredded newsprint impregnated with chicken manure.

17. The process of claim 15 including the step of mixing superphosphate into the nutrient mixture prior to said extruding step.

18. The process of claim 15 including the step of mixing a protein additive into the nutrient mixture prior to said extruding step.

19. The process of claim 15 including the step of mixing fishmeal into the nutrient mixture prior to said extruding step.

20. The process of claim 15 wherein said extruding step comprises mincing the nutrient mixture to compact the mixture and to force the mixture to extrude through a plurality of extrusion openings in the die plate.

21. The process of claim 15 wherein said moisture controlling step comprises selectively mixing dry material with the nutrient mixture in appropriate quantity prior to said extruding step to control the heat of friction arising during said extruding step such that said heat of friction substantially dries and at least partially sterilizes the extruded nutrient mixture.

22. The process of claim 21 wherein said step of selectively mixing dry material comprises mixing shredded newsprint with the nutrient mixture prior to said extruding step.

* * * * *

UNITED STATES PATENT AND TRADEMARK OFFICE
CERTIFICATE OF CORRECTION

PATENT NO. : 4,813,996

DATED : March 21, 1989

INVENTOR(S) : Thomas H. Gardner et al.

It is certified that error appears in the above-identified patent and that said Letters Patent is hereby corrected as shown below:

Column 4, line 18, delete "forming" and insert therefor --extruding--.

Column 4, line 54, before "pellets" insert --extruded--.

Signed and Sealed this

Thirteenth Day of February, 1990

*Attest:*

JEFFREY M. SAMUELS

*Attesting Officer*     *Acting Commissioner of Patents and Trademarks*